United States Patent [19]

Pelly

[11] Patent Number: 5,047,912
[45] Date of Patent: Sep. 10, 1991

[54] FOUR-TERMINAL UNITY POWER FACTOR ELECTRONIC RECTIFIER

[75] Inventor: Brian R. Pelly, Palos Verdes Estates, Calif.

[73] Assignee: International Rectifier Corporation, El Segundo, Calif.

[21] Appl. No.: 580,101

[22] Filed: Mar. 9, 1990

[51] Int. Cl.⁵ .............................................. H02M 7/06
[52] U.S. Cl. ........................................ 363/89; 363/44; 323/222
[58] Field of Search ...................... 363/44, 45, 46, 47, 363/48, 84, 89, 124, 126; 323/222

[56] References Cited

U.S. PATENT DOCUMENTS 4,340,931 7/1982 Endo et al. .......................... 363/126
4,677,366 6/1987 Wilkinson et al. ................... 363/89
4,831,508 5/1989 Hunter ................................. 363/89
4,959,766 9/1990 Jain ..................................... 363/126

Primary Examiner—Peter S. Wong
Attorney, Agent, or Firm—Ostrolenk, Farber, Gerb & Soffen

[57] ABSTRACT

A four-terminal, unity power factor, electronic rectifier module. The electronic rectifier module is self-contained and includes therein bridge diodes which form a full wave bridge rectifier, a control circuit, and a diode which components act together to draw a sinusoidal current from the line. The self-contained, four-terminal module is designed to permit a high-frequency input capacitor and a line inductor to be connected to its input terminals and a smoothing capacitor to its output terminal. The module avoids the need to provide a separate pair of power terminals for the standard filtering components, resulting in a more economical package and in an easier-to-use module.

13 Claims, 3 Drawing Sheets

4-TERMINAL "ELECTRICAL RECTIFIER"

4-TERMINAL "ELECTRICAL RECTIFIER"

FOUR-TERMINAL UNITY POWER FACTOR ELECTRONIC RECTIFIER

BACKGROUND OF THE INVENTION

The present invention relates to a power rectifier module and, more particularly, to a power rectifier module which draws power from the line at unity power factor and which contains only four user accessible terminals.

Bridge rectifiers are used extensively for converting AC line voltage to smooth DC power for all kinds of electrical and electronic devices Typical applications include switching power supplies, motor controls, etc.

Conventional bridge rectifiers have DC smoothing capacitors and draw a non-sinusoidal current from the power line which is rich in harmonics, i.e., sharp edged current pulses These current pulses of conventional bridge rectifiers have a tendency to "contaminate" the power line and, as a result, increasingly more stringent regulations are being enacted throughout the world which impose restrictions on rectification of the line voltage In response, the prior art has evolved methods for drawing current from the line in a manner which eliminates or ameliorates the problem Essentially, the method is based on controlling the manner in which current is drawn so that power is drawn from the line at or near a unity power factor. Examples of the prior art's solution to this problem are described in a pair of application notes from Siemens, including a first application note entitled "ACTIVE HARMONIC FILTERING FOR LINE RECTIFIERS OF HIGHER OUTPUT POWER" published in SIEMENS COMPONENTS, January, 1986, pp. 9–13 and in a second application note entitled "TDA 4814-INTEGRATED CIRCUIT FOR SINUSOIDAL LINE CURRENT CONSUMPTION" originally published in SIEMENS COMPONENT, March, 1986, pp. 103–107.

The solution of the prior art requires a user to assemble his own "electronic rectifier", using discrete components, including a bridge rectifier, a MOSFET, a series diode, and a control chip. Of course, all of these components can be packaged in a single module. But this would require six power terminals including: two input terminals, two output terminals, and another two terminals to loop the standard external inductor and capacitors into the circuit.

SUMMARY OF THE INVENTION

Accordingly, a main object of the present invention is to provide a self-contained rectifier module which operates at unity power factor and which is simpler to use in a circuit It is also an object of the invention to provide a unity power factor rectifier module which avoids having to provide an extra pair of terminals for the standard external inductor and capacitor elements It is a further object of the invention to provide a unity power factor rectifier module which contains only four user accessible terminals It is still a further object of the invention to provide a unity power factor rectifier module of the above-mentioned type which is less expensive to fabricate and easier to use.

The foregoing and other objects of the invention are realized by a unity power factor rectifier module which includes only four user accessible terminals, and which provides a regulated DC voltage at its output and draws "unpolluted" current at its input. Essentially, the module is self-contained and comprises a conventional "passive" bridge rectifier, preferably a full wave rectifier, an electronic controller for controlling the current being drawn to obtain unity power factor, a pair of input terminals and a pair of output terminals. The bridge rectifier is coupled to the input terminals of the module and the electronic controller to the output terminals thereof.

In typical use, the invention permits a circuit designer to apply a DC output smoothing filter capacitor to the output terminals and appropriate external high frequency filter components, e.g., an L-C filter, to the input terminals of the module, instead of to terminals which are dedicated exclusively to receive these components, as in the prior art.

Other features and advantages of the present invention will become apparent from the following detailed description of the invention which refers to the accompanying drawings.

DETAILED DESCRIPTION OF THE DRAWINGS

Figure 1:
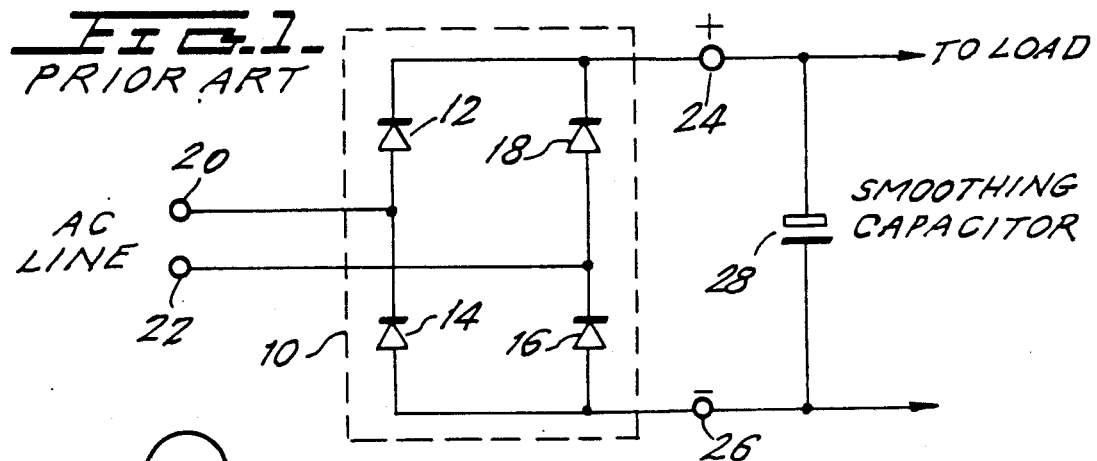
FIG. 1 is a schematic of a conventional, passive bridge rectifier.
Figure 2:
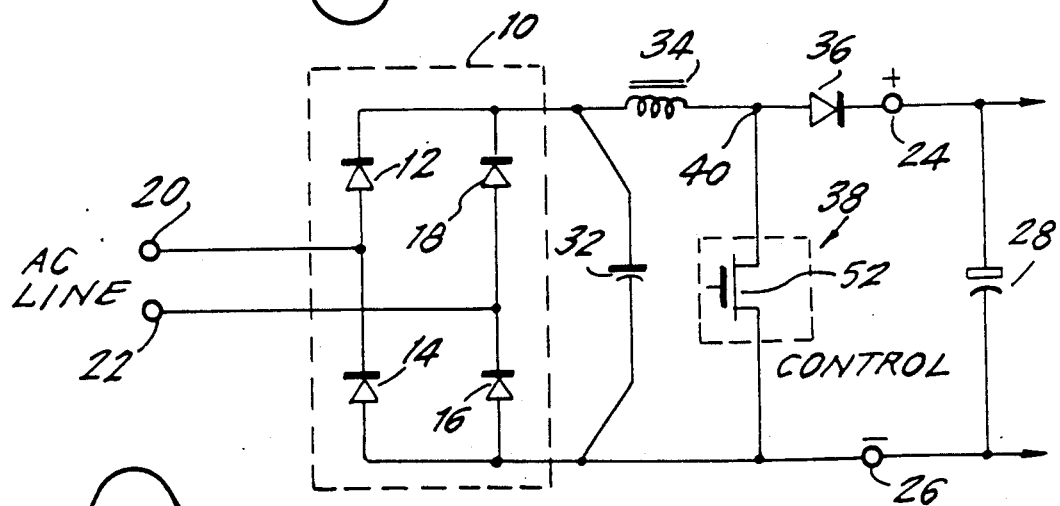
FIG. 2 is a block diagram of a conventional rectifier with an electronic controller.

For a better understanding of the present invention, it is instructive to examine the structures of prior art FIGS. 1 and 2. In the prior art, a four-terminal, passive, single phase bridge rectifier module 10 is essentially comprised of diodes 12, 14, 16 and 18, connected as shown AC line power which is applied to the input terminals 20 and 22 is rectified and converted to a DC voltage at output terminals 24 and 26. Typically, a smoothing capacitor 28 is connected across the output terminals 24 and 26.

Figure 1A:
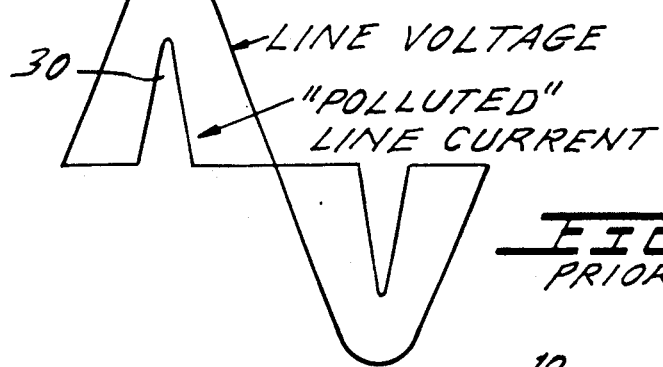
FIG. 1A depicts the current waveform of the rectifier of FIG. 1.

The module draws a non-sinusoidal current which is rich in harmonics because it is typically comprised of comparatively narrow, fast-rising current pulses, as shown by the reference numeral 30 in FIG. 1A. This non-sinusoidal current 30 pollutes the line.

A solution of the prior art to this line polluting problem is shown in FIG. 2. It is based on connecting a high-frequency capacitor 32 across the rectifier circuit 10 and further includes a series-connected circuit comprising inductor 34 and diode 36. The prior art also teaches to connect a control circuit 38, typically MOSFET-based, between the junction 40 between the inductor 34 and the anode of the diode 36 and the output terminal 26 A specific embodiment of the control circuit 38 is described in the aforementioned Siemens application notes.

Figure 2A:
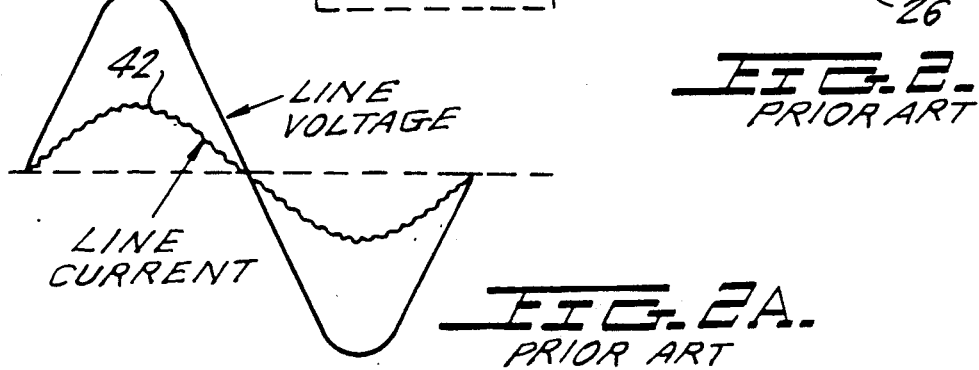
FIG. 2A depicts the current waveform of the rectifier of FIG. 2.

In any case, with the foregoing solution of the prior art, the line current assumes a sinusoidal waveshape 42, shown in FIG. 2A, which is in phase with the line voltage This substantially reduces or eliminates the previously discussed line polluting problem.

The prior art solution of FIG. 2 requires a circuit designer to assemble his or her own "electronic rectifier", using discrete components. Of course, all of the prior art components can be packaged in a single module. However, the values of the capacitors 32 and 28, as well as of the inductor 34, must be selected to suit the requirements of each given application Consequently, the circuit of FIG. 2, even if it were to be packaged in a single module, suffers from the drawback that it needs six power terminals—two input, two output and two terminals to loop the external inductor/capacitor into the circuit.

Figure 3:
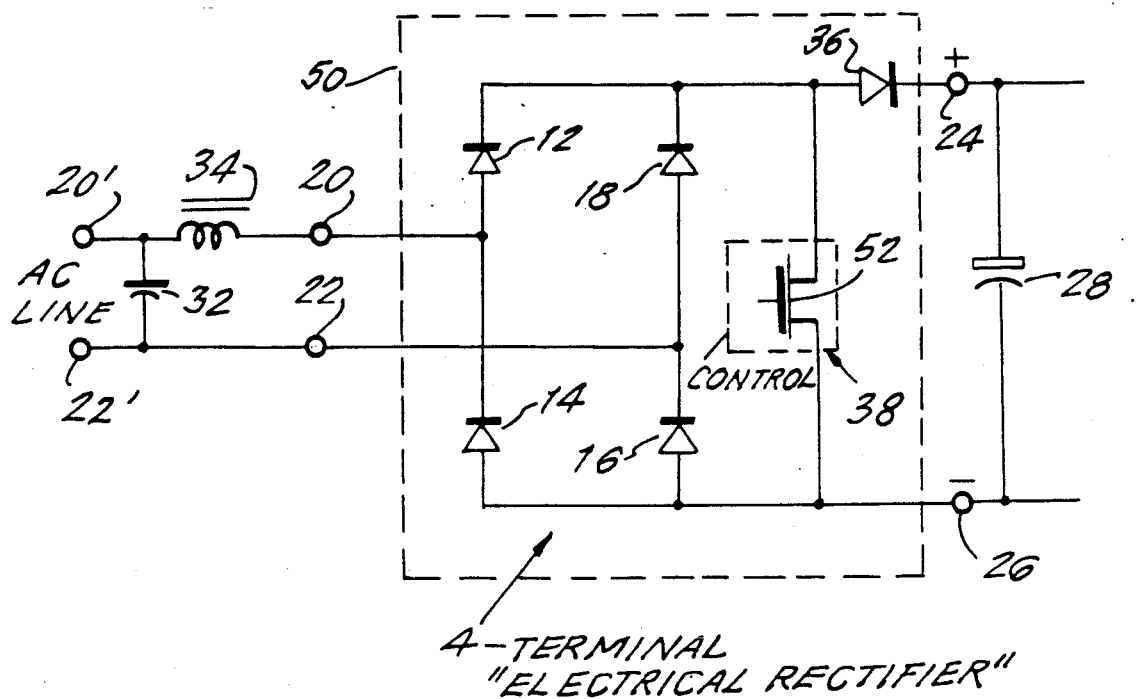
FIG. 3 is a schematic of a four-terminal electronic rectifier and associated filter components in accordance with a first embodiment of the present invention.

However, this drawback of the prior art is avoided by the present invention in accordance with which, as depicted in FIG. 3, a single self-contained module 50 is provided which contains in it only the diodes 12, 14, 16 and 18, the control circuit 38 and the diode 36. Connection of the capacitor 32 and the inductor 34 is left to the circuit designer who may connect these components to the input terminals 20 and 2 of the module 50, as shown. The output smoothing capacitor 28 is similarly connectable to the output terminals 24 and 26.

Thus, by shifting the high frequency input filter capacitor 32 and the line inductor 34 to the AC side of the bridge rectifier, it is possible to eliminate two power terminals which would otherwise be necessary in the module 50. The module 50, therefore, provides the desired, self-contained, four-terminal module which is less costly to fabricate and which also provides a more "user friendly" part for use by circuit designers. Note, too, that locating the bridge rectifier diodes in the four-terminal module 50, insulated from the line by the inductor 34, also serves to shelter the bridge diodes 12, 14, 16, and 18 from line voltage transients.

Thus, the present invention connects the input filtering circuit (which is comprised of the capacitor 32 and the inductor 34) so that the capacitor 32 is connected between AC input terminals 20' and 22' and the inductor 34 is disposed in series between the terminals 20' and 20.

Active over-voltage protection could be provided by turning on a MOSFET 52 in the control circuit 38 when line over-voltages occur, possibly eliminating the need for an external voltage protection device such as a MOV.

Another possible advantage ensues from the contemplated ability to provide the inductor 34 in a smaller size than it would have to have had in the conventional circuit of FIG. 2. It is believed that this expected reduction in the size of the inductor 34 is due to bidirectional flux which flows through the inductor 34 in the embodiment of FIG. 3.

Figure 4:
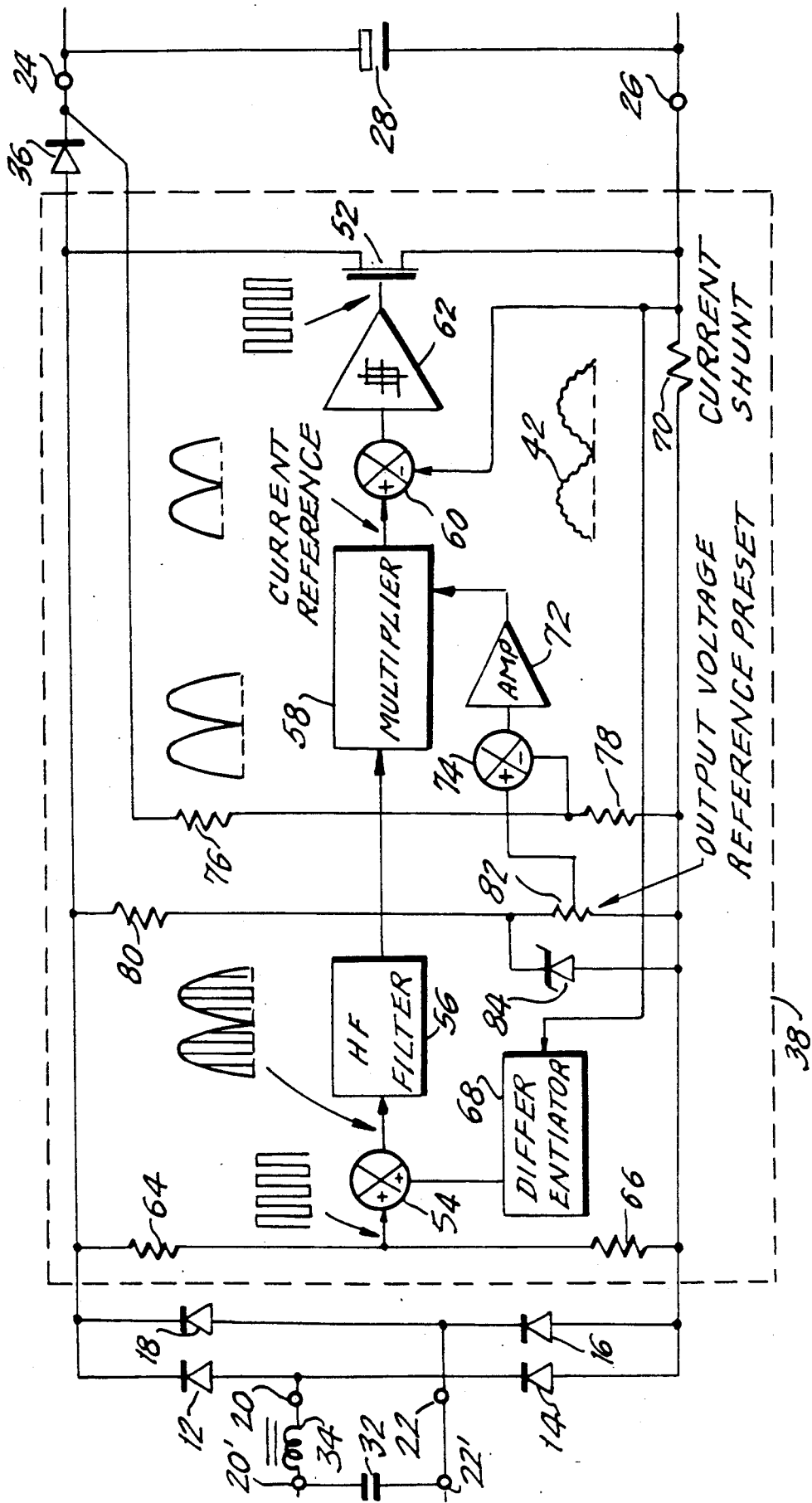
FIG. 4 is a schematic which corresponds to FIG. 3, depicting in greater detail the electronic controller thereof.

Referring now to FIG. 4, the control circuit 38 includes, in accordance with a preferred embodiment, a summing circuit 54, the output of which is supplied to a high-frequency filter 56 and thereafter to a multiplier 58. The output of the multiplier is fed to the positive input of a subtractor 60. The subtractor 60 supplies its output to an amplifier 62 which drives the gate of the switching MOSFET 52.

The aforementioned summing circuit 54 receives a first input from an input voltage divider which is comprised of resistors 64 and 66 and a second input from a differentiator 68 which is driven from a tap of a current sensor 70.

The aforementioned subtractor 60 also responds to the signal from the current sensor 70.

The aforementioned multiplier 58 is further controlled by the output of an amplifier 72 whose input is supplied from a subtractor 74 which receives and responds to the output of a voltage divider comprised of resistors 76 and 78. This voltage divider senses the regulated output voltage at the output terminal 24.

The subtractor 74 also responds to a second input from a further voltage divider which is comprised of a resistor 80 and a potentiometer 82. The potentiometer 82 is set at the factory to obtain a desired output voltage level at the output terminal 24. The zener diode 84 provides a regulated reference voltage across the potentiometer 82.

Accordingly, the control circuit 38 comprises a filtering circuit for filtering a rectified line voltage produced in the module by summing the output voltage of the rectifying diodes 12, 14, 16 and 18 with the differential of the line current (representing the voltage across inductor 34), to "reconstruct" a replica of the line voltage, a switching device, e.g. the MOSFET 52, a multiplier coupled to the switching device, and an output feedback circuit. The multiplier is responsive to the output from the filtering circuit, representing the instantaneous line voltage and to another output from the feedback circuit, representing the instantaneous line current. The feedback circuit includes the resistors 76 and 78 which feed back a portion of the output at terminal 24.

Figure 5:
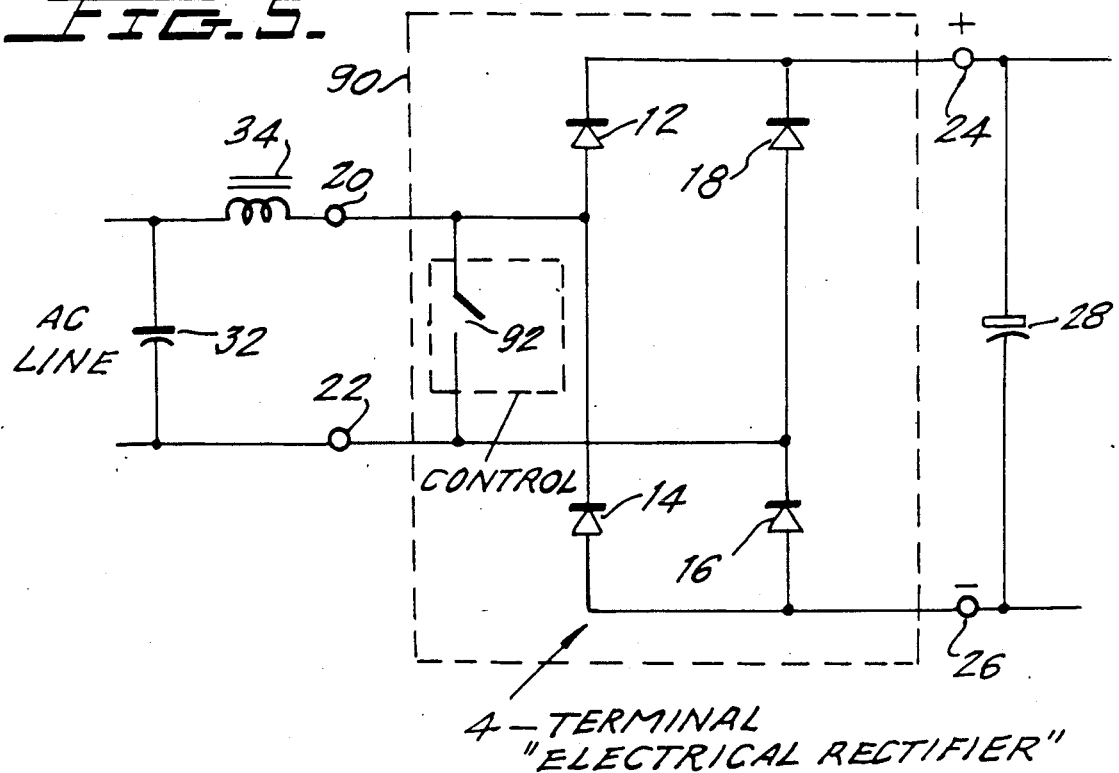
FIG. 5 is a schematic/block diagram of a second embodiment of a four-terminal electronic rectifier module in accordance with the present invention.

The circuit which is depicted in FIG. 4, i.e., the control circuit 38, serves to switch the MOSFET 52 on and off in a manner which draws from the line a current whose shape is forced to correspond to that of the "reconstructed" line voltage, with a waveshape similar to the waveshape 42 in FIG. 2. The circuit of the present invention is effective for causing the module 50 to draw power from the line at substantially unity power factor, effectively eliminating the line polluting problem FIG. 5 depicts a modified four-terminal electronic rectifier 90 which is essentially comprised of the diodes 12, 14, 16 and 18 and a bidirectional high-frequency switch 92 which comprises the control circuit. This high-frequency bidirectional AC switch is deployed to accomplish the same function as that provided by the control circuit 38 in FIG. 4. In addition, however, it also eliminates the series diode 36.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic power rectifier, comprising:
   a self-contained electronic power rectifier module having first and second user-accessible input terminals suited for being coupled to an AC input voltage filtering circuit and first and second user-accessible output terminals, said electronic power rectifier module lacking terminals dedicated for connection thereto of filtering circuit means;

a rectifier bridge within said module and coupled to said first and second input terminals; and control means in said module for controlling the current drawn via said first and second input terminals in a manner which is effective to cause said module to draw power from said input terminals at substantially unity power factor.

2. The electronic power rectifier of claim 1, wherein said rectifier bridge comprises a full wave rectifier bridge and wherein said bridge is directly connected to the first and second input terminals.

3. The electronic power rectifier of claim 2, further comprising a diode connected directly to said first output terminal.

4. The electronic power rectifier of claim 3, wherein said control means is disposed electrically between said diode and said bridge rectifier.

5. The electronic power rectifier of claim 4, wherein said control means comprises a filtering circuit for filtering a rectified line voltage produced in said module, a switching device, a multiplier coupled to said switching device, and an output feedback circuit, said multiplier being responsive to an output from said filtering circuit and another output from said feedback circuit 6. The electronic power rectifier of claim 5, wherein said control circuit is effective for causing said module to draw a sinusoidal current through said input terminals.

7. The electronic power rectifier of claim 1, wherein said control circuit comprises an AC bidirectional power switch connected to said input terminals.

8. The electronic power rectifier of claim 1, further including an input filtering circuit comprising a capacitor and an inductor wherein the inductor has a first contact which is connected to the first input terminal, a second contact which is connected to a first contact of the capacitor and the capacitor includes a second contact which is connected to the second input terminal 9. The electronic power rectifier of claim 8, further comprising an output filtering capacitor connected in parallel across the first and second output terminals of the module.

10. An electronic power rectifier, comprising:
a self-contained electronic power rectifier module having no more than four user-accessible terminals including first and second input terminals for being coupled to an input voltage and first and second output terminals;

a rectifier bridge within said module and coupled to said first and second input terminals; and control means in said module for controlling the current drawn via said first and second input terminals in a manner which is effective to cause said module to draw power from said input terminals at substantially unity power factor 11. The electronic power rectifier of claim 10, wherein said rectifier bridge comprises a full wave rectifier bridge and wherein said bridge is directly connected to the first and second input terminals.

12. The electronic power rectifier of claim 11, further comprising a diode connected directly to said first output terminal 13. The electronic power rectifier of claim 12, wherein said control means is disposed electrically between said diode and said bridge rectifier.

* * * * *